United States Patent
Haumont

(10) Patent No.: US 8,260,372 B2
(45) Date of Patent: Sep. 4, 2012

(54) TRAFFIC MONITORING FOR REGULATING STATES OF A TERMINAL

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 1710 days.

(21) Appl. No.: 11/477,764

(22) Filed: Jun. 30, 2006

(65) Prior Publication Data
US 2008/0039032 A1 Feb. 14, 2008

(51) Int. Cl.
*H04B 1/38* (2006.01)
*H04M 1/00* (2006.01)
(52) U.S. Cl. ............ 455/574; 709/232; 455/115.1
(58) Field of Classification Search .............. None
See application file for complete search history.

(56) References Cited

U.S. PATENT DOCUMENTS

| | | | |
|---|---|---|---|
| 6,212,175 B1 | 4/2001 | Harsch | |
| 6,480,476 B1* | 11/2002 | Willars | 370/311 |
| 6,717,928 B1* | 4/2004 | Kalliokulju et al. | 370/335 |
| 6,904,033 B1* | 6/2005 | Perras et al. | 370/338 |
| 7,088,698 B1* | 8/2006 | Harsch | 370/338 |
| 7,313,419 B2* | 12/2007 | Islam et al. | 455/574 |
| 7,397,790 B2* | 7/2008 | Zeira et al. | 370/352 |
| 7,505,795 B1* | 3/2009 | Lim et al. | 455/574 |
| 2002/0163906 A1* | 11/2002 | Diachina et al. | 370/349 |
| 2002/0172178 A1 | 11/2002 | Suzuki et al. | |
| 2003/0002537 A1* | 1/2003 | Schaller | 370/503 |
| 2003/0128676 A1* | 7/2003 | Lee | 370/328 |
| 2003/0143959 A1 | 7/2003 | Harris et al. | |
| 2003/0153309 A1* | 8/2003 | Bjelland et al. | 455/432 |
| 2004/0017792 A1* | 1/2004 | Khaleghi et al. | 370/335 |
| 2004/0179492 A1* | 9/2004 | Zhang et al. | 370/331 |
| 2004/0219921 A1* | 11/2004 | Cao et al. | 455/444 |
| 2005/0021770 A1* | 1/2005 | Helm et al. | 709/228 |
| 2005/0165944 A1* | 7/2005 | Xue et al. | 709/232 |
| 2005/0192046 A1* | 9/2005 | Harris | 455/552.1 |
| 2005/0265279 A1* | 12/2005 | Markovic et al. | 370/328 |
| 2006/0018290 A1* | 1/2006 | Zhao | 370/335 |
| 2006/0045080 A1* | 3/2006 | Islam et al. | 370/389 |
| 2006/0050667 A1* | 3/2006 | Verma et al. | 370/338 |
| 2006/0094478 A1* | 5/2006 | Kim et al. | 455/574 |
| 2007/0019610 A1* | 1/2007 | Backholm et al. | 370/349 |
| 2007/0259673 A1* | 11/2007 | Willars et al. | 455/453 |
| 2007/0291658 A1* | 12/2007 | Knapik et al. | 370/252 |
| 2008/0070574 A1* | 3/2008 | Vikberg et al. | 455/435.2 |
| 2008/0311927 A1* | 12/2008 | Boman et al. | 455/456.1 |

FOREIGN PATENT DOCUMENTS

EP 1 294 206 A2 3/2003

OTHER PUBLICATIONS

International search report for international application No. PCT/IB2007/001945 filed Jun. 27, 2007.
Jeff Doyle, Jennifer DeHaven Carroll, "*Network Address Translation*", Feb. 8, 2002, Cisco web pages, pp. 1-7.
F. Audet, C. Jennings, "*NAT Behavioral Requirements for Unicast UDP*", Cisco Systems, Sep. 6, 2005, pp. 1-28.

(Continued)

*Primary Examiner* — Rafael Pérez-Gutiérrez
*Assistant Examiner* — Frank Donado
(74) *Attorney, Agent, or Firm* — Harrington & Smith

(57) ABSTRACT

Embodiments of the invention include a method comprising monitoring a traffic pattern relating to a terminal, and regulating states of the terminal according to the monitored traffic pattern. Other embodiments relate to associated apparatus, communication systems, network elements and computer program products.

23 Claims, 3 Drawing Sheets

OTHER PUBLICATIONS

Check Point Software Technologies, "*Check Point Management Guide, NG FP2*", Part No. 700348, Mar. 2002. pp. 1-904.

Iyer Prakash, "*UPnP Internet Gateway Device: 1 Device Template Version 1.01*", Nov. 2001, pp. 1-16.

Warrier, Ulhas et al., "*Landevice:1 Device Template Version 1.01*", for Universal Plug and Play Version 1.0, Nov. 12, 2001, pp. 1-9.

Blaszczak, Mike et al., "*LANHostConfigManagement: 1 Service Template Version 1.01*" for Universal Plug and Play Version 1.0, Nov. 12, 2001, pp. 1-27.

Prakash, Iyer e t al., "*Layer3Forwarding:1 Service Template Version 1.01*" for Universal Plug and Play Version 1.0, Nov. 12, 2001, pp. 1-14.

Schmitz, Matthew et al., "*WANCableLinkConfig: 1 Service Template Version 1.01*", for Universal Plug and Play Version 1.0, Nov. 12, 2001, pp. 1-25.

Warrier, Ulhas et al., *ANCommonInterfaceConfig: 1 Service Template Version 1.01*, for Universal Plug and Play Version 1.0, Nov. 12, 2001, pp. 1-24.

Pennerath, Frederic et al., "*WANConnectionDevice: : 1 Service Template Version 1.01*", for Universal Plug and Play Version 1.0, Nov. 12, 2001, pp. 1-.

Warrier, Ulhas et al., "*WANDevice: 1 Device Template Version 1.01*", for Universal Plug and Play Version 1.0, Nov. 12, 2001, pp. 1-12.

Pennerath, Frederic et al., "*WANDSLLinkConfig: : 1 Service Template Version 1.01*", for Universal Plug and Play Version 1.0, Nov. 12, 2001, pp. 1-27.

Prakash, Iyer, "*WANEthernetLinkConfig:: 1 Service Template Version 1.01*", for Universal Plug and Play Version 1.0, Nov. 12, 2001, pp. 1-10.

Warrier, Ulhas et al., "*WANIPConnection : 1 Service Template Version 1.01*" for Universal Plug and Play Version 1.0, Nov. 12, 2001, pp. 1-74.

Warrier, Ulhas et al., "*WANPOTSLinkConfig : 1 Service Template Version 1.01*", for Universal Plug and Play Version 1.0, Nov. 12, 2001, pp. 1-21.

Warrier, Ulhas et al., "*WANPPPConnection : 1 Service Template Version 1.01*", for Universal Plug and Play Version 1.0, Nov. 12, 2001.

Cisco Systems, "*Cisco IOS IP Addressing Services Command Reference, Release 12.4*", Jun. 2005, pp. 1-296.

Juniper Networks, "*NetScreen CLI Reference Guide*", Version 5.2.0, P/N 093-1592-000 Rev. A, May 2005, pp. 1-705.

Martin Stiemerling, Hannes Tschofenig, and Cedric Aoun, "*NAT/Firewall NSIS Signaling Layer Protocol (NSLP)*", Internet-Draft draft-ietf-nsis-nslp-natfw-07, NSIS Working Group, Jul. 18, 2005, pp. 1-101.

Stuart Cheshire, Marc Krochmal, Kiren Sekar, "*NAT Port Mapping Protocol (NAT-PMP)*", Internet-Draft draft-cheshire-natpmp-00, Jun. 7, 2005, pp. 1-15.

B. Leiba, "*IMAP4 IDLE Command*", IETF RFC 2177, Jun. 1997, pp. 1-4.

Rosenberg, J., Weinberger, J. Huitema, C., and R. Matey, "*STUN-Simple Traversal of User Datagram Protocol (UDP) Through Network Address Translators (NATs)*", RFC 3489, Mar. 2003, pp. 1-44.

M. Crispin, "*Internet Message Access Protocol—Version 4rev1*", IETF RFC 3501, Mar. 2003, pp. 1-81.

H. Levkowetz, S. Vaarala, "*Mobile IP Traversal of Network Address Translation (NAT) Devices*", RFC 3519, Apr. 2003, pp. 1-27.

T. Kivinen et al., "*Negotiation of NAT-Traversal in the IKE*", IETF RFC 3947, Jan. 2005, pp. 1-13.

A. Huttunen et al., "*UDP Encapsulation of IPsec ESP Packets*", IETF RFC 3948, Jan. 2005, pp. 1-12.

J. Rosenberg, "*Interactive Connectivity Establishment (ICE): Methodology for Network Address Translator (NAT) Traversal for Offer/Answer Protocols*", draft-ietf-mmusic-ice-06, Oct. 19, 2005, pp. 1-76.

Rosenberg, J.et al., "*Traversal Using Relay NAT (TURN)*", Sep. 9, 2005, pp. 1-40.

Martin Stiemerling, Juergen Quittek and Christian Cadar, "*Simple Middlebox Configuration (SIMCO) Protocol Version 3.0*", Sep. 2004, pp. 1-64.

"ASDM Online Help Release 5.0(4)", Cisco Systems, Inc., Oct. 2005, 691 pgs.

"CI Command Reference", http://www.zyxeltech.de/snotep480/ci__cmd/ci__cmd.htm, Nov. 2009, 5 pgs.

"New Era for SMB Security Network Protection", ZyWALL 36 UTM, http://www.zyxel.com/web/product_print_version.php?PC1indexflag=20040908175941...; Nov. 2009, 3 pgs.

"Prestige 660W/Hw Series, ADSL 2/2+ Gateway with 802.11g Wireless" ZyXel Communication Corporation, Compact Guide Version 3.40, May 2004, 40 pgs.

"ADSM Online Help, Release 5.0(1)", Cisco Systems, May 2005.

"Nokia IP VPN Gateway Configuration Guide, Version 6, N451439003 Rev. A.", Nokia Corporation, Jun. 2005.

"Zyxel CI Command Reference", http://www.zyxel.com/support/supportnote/p.314/c1__cmd/0314__ci .htm; Zyxel 2001.

"Prestige 660W/Hw Series ADSL Wireless User's Guide, Version 3.04", Zyxel Communications Corporation, Jun. 2004.

"ZyWALL 3/35/70 Series Internet User's Guide, Version 4.00", Zyxel Communications Corporation, Aug. 2005.

\* cited by examiner

TRAFFIC MONITORING FOR REGULATING STATES OF A TERMINAL

FIELD

The present invention relates to the field of telecommunications, and in particular to methods for conserving battery power in user equipment and reducing unnecessary signaling in telecommunications networks.

BACKGROUND

A communication system can be seen as a facility that enables communication sessions between two or more entities such as user equipment and/or other nodes associated with the communication system. The communication may comprise, for example, communication of voice, data, multimedia and so on.

Communication systems providing wireless communication for user equipment are known. Cellular communication systems are configured to have a cell structure, and typically they support communication with user equipment changing locations (mobile users). The support for communications for mobile users may include support for handing existing connections from one cell to another cell. At least routing of calls or communications for a mobile user in a new cell is typically supported in cellular systems. Some examples of a cellular system are the Global System for Mobile Telecommunications (GSM) and UMTS (Universal Mobile Telecommunication System).

A communication system may be circuit switched or packet switched. General Packet Radio Service (GPRS) provides packet-switched data services for the GSM and UMTS system.

A technical problem commonly encountered in telecommunications systems is how to reduce or minimize both power consumption of terminals and unnecessary signaling in the network. The issues of power consumption and unnecessary signaling are often linked due to the fact that signal transmission typically accounts for a major part of the overall power consumption of a terminal.

Reducing power consumption by terminals is particularly important in mobile telecommunications networks, due to the fact that mobile terminals are typically battery powered and thus have a finite power reserve. Excessive power consumption by mobile terminals can lead to unacceptably short intervals before the terminal battery needs to be recharged.

Power consumption of mobile terminals can be a particular problem when the terminal is running one or more "always-on" applications. Always-on applications require the terminal to be constantly attached to a radio network and to be reachable over the current radio technology. Examples of always-on applications include push e-mail, instant messaging, and voice and video telephony.

Many always-on applications need to transmit or receive frequent "keep-alive" messages during the idle times in order to refresh the soft state in the application servers or intermediate firewalls and Network Address Translation (NAT) devices. The keep-alive procedures may maintain the MS in states which consume so much energy that the battery lifetime will no longer be acceptable. Since IPsec Virtual Private Network (VPN) and Mobile IP sessions may be used with always-on applications to provide security and mobility, increasing the power efficiency of these protocols is particularly important.

Embodiments of the present invention aim to address one or more of the above-mentioned problems. In particular, embodiments of the present invention aim to reduce power consumption and/or unnecessary signalling by terminals in a communications network.

SUMMARY

Accordingly, in one embodiment the present invention provides a method (e.g. for use in a telecommunications system) .comprising monitoring a traffic pattern relating to a terminal, and regulating states (e.g. states of the Mobility Management protocol or of the Radio Ressource Control protocol) of the terminal according to the monitored traffic pattern.

In another embodiment, the present invention provides an apparatus (e.g. a network node in a communications system) configured to monitor a traffic pattern relating to a terminal, and regulate states of the terminal according to the monitored traffic pattern.

In another embodiment, the present invention provides a communications system comprising a terminal and a network node, wherein the communications systems is configured to monitor a traffic pattern relating to a terminal, and regulate states of the terminal according to the monitored traffic pattern.

In another embodiment, the present invention provides a network element comprising monitoring means for monitoring a traffic pattern relating to a terminal and regulating means for regulating states of the terminal according to the monitored traffic pattern.

In another embodiment, the present invention provides a computer program product, comprising a set of instructions which when executed by a processor in a network node of a communications system, causes the network node to monitor a traffic pattern relating to a terminal, and regulate states of the terminal according to the monitored traffic pattern.

In another embodiment, the present invention provides a computer program comprising program code means adapted to perform any of the steps of a method as described above when the program is run on a processor.

In another embodiment, the present invention provides a computer program product comprising program code means stored in a computer readable medium, the program code means being adapted to perform any of the steps of a method as described above when the program is run on a processor.

Embodiments of the present invention may advantageously reduce power consumption and/or unnecessary signalling of terminals by dynamically adapting states (e.g. Radio Resource Control or Mobility Management states) of a terminal according to the pattern of traffic to/from the terminal. In the absence of such dynamic control, the traffic pattern may greatly affect the amount of time which a terminal spends in particular radio resource states, which in turn is highly determinative of the power consumption of the terminal. According to embodiments of the present invention, the time spent by the terminal in particular states can be regulated such that, for example, a power consumption increase due to an increase in particular types of traffic is minimized. By monitoring a traffic pattern to/from the terminal, embodiments of the present invention allow the configuration of states to be tailored to the activity and particular requirements of the terminal, and the power consumption of the terminal to be kept within acceptable limits. This can increase battery life of the terminal, especially in mobile terminals, as well as freeing radio and SGSN resources.

In some embodiments of the present invention, the states are regulated through timers. After a defined period of time during which the terminal is inactive, e.g. during which the terminal does not transmit or receive any packet data, the timer expires. Typically the expiry of the timer causes the terminal to transition to a new state with a lower power. Setting of the timer involves defining a length of this period of inactivity before which the terminal shifts to a less power-consuming state.

A terminal may have multiple states each having a different power consumption, and thus there may be multiple inactivity timers, each of which defines the length of an inactivity period before which the terminal shifts to a less power-consuming state.

In other embodiments, if the frequency of the monitored traffic events (e.g. keep alive messages) increases, a length of the timer period (i.e. the period of inactivity after which the terminal shifts to a less power-consuming state) is decreased. This is because if a terminal is sending a lot of traffic, such as frequent keep-alive messages, it would tend to spend more time in higher power-consuming states and its overall power consumption would increase. Decreasing the length of one or more timer periods in this situation minimizes the increase in power consumption by ensuring that the terminal returns to a lower power state more quickly after each transmission event (such as sending or receiving a keep alive message).

Alternatively, if the frequency of keep alive messages decreases, a length of the timer setting is increased. This is because if the terminal is not sending a lot of traffic, its power consumption will be lower and it is acceptable for it to spend more time in higher power states.

Preferably the traffic monitoring step of the present invention may involve detecting a pattern of transmission of messages to/from the terminal, wherein the messages serve to maintain a connection between the terminal and a further node in the communication system. More preferably the monitored traffic comprises keep alive messages transmitted to/from the terminal. In one embodiment the monitoring comprises detecting a frequency of transmission of messages such as keep alive messages relating to the terminal.

Preferably the terminal is a mobile terminal, and the network is a mobile telecommunications network.

The monitoring step typically results in a set of data, for instance in the form of a traffic profile, indicative of the traffic pattern associated with the terminal. The method preferably further comprises storing this data or profile in a node in the telecommunications system. The data may be stored in any suitable node in the network, for instance in a first controller node having a connection with the terminal. By controller node is meant any node which performs control functions relating to a connection between the terminal and another node. Thus in some embodiments, the controller node may be a serving GPRS support node (SGSN) or radio network controller (RNC). The first controller node may be a node which also performs the monitoring step or may be a different node in the communication system.

The method may further comprise transmitting the data to a second controller node, for instance when the terminal establishes a connection with the second controller node.

The traffic pattern may be monitored by any suitable node in the communications network, for instance a controller node having a connection with the terminal. Preferably the node performing the monitoring step is an SGSN or RNC serving the terminal.

The regulation of the states of the terminal, for instance the setting of inactivity timers for the terminal, may be performed by any suitable node in the telecommunications system. In one embodiment, a controller node (for instance the controller node which performs the traffic monitoring step) sends an indication of an inactivity timer setting to the terminal in an attach accept message, a routing area accept message or a dedicated timer modification message. In the case of attach accept and routing area accept messages, the timer setting indication is added to a type of message which carries other data and would anyway be transmitted between the terminal and the node. In the case of a dedicated timer modification message, the timer setting indication is provided in a message specifically transmitted for the purpose of modifying the timer.

In other embodiments, the method further comprises monitoring mobility of the terminal. For instance, the controller node may monitor the frequency of cell changes of the terminal. Mobility of the terminal may then be taken into account when regulating the states of the terminal, for instance when setting the inactivity timers, in addition to the traffic pattern (e.g. the frequency of keep-alive messages) associated with the terminal.

If mobility of the terminal decreases, the timer setting (i.e. the length of the inactive period after which the terminal transitions to a lower power state) is preferably increased. This is because if the terminal is relatively static (i.e. its location is not changing), it will not be sending many cell update messages. Its power consumption will therefore be relatively low (compared to a terminal which is highly mobile) and an increasing the amount of time spent in a higher power state is acceptable.

In some embodiments, monitoring the traffic pattern of a terminal may include measuring a level of paging traffic associated with the terminal. In lower power states, a terminal may not be able to send or receive data without transitioning to a higher power state. In order for a terminal in a low power state to receive data, it is often necessary to page the terminal so that it can shift to a higher power state and receive the data. The amount of paging traffic may therefore be indicative of the amount of time which the terminal is spending in lower power states combined with the frequency with which it is sending/receiving keep alive messages. Decreasing the timer settings for terminals sending a lot of keep alive messages according to embodiments of the present invention may increase the paging traffic, whereas increasing the timer settings for terminals sending fewer keep alive messages will tend to reduce paging traffic. Monitoring the level of paging traffic to a terminal and taking this into account (along with the keep alive frequency and optionally also the mobility of the terminal) when setting the timers can help to ensure that the paging channel does not become overloaded.

In other embodiments, the monitored traffic data for the terminal (and optionally further the mobility of the terminal) may additionally be used in setting the value of a periodic routing area update timer for the terminal.

BRIEF DESCRIPTION OF THE DRAWINGS

The invention will now be described by way of example only with reference to the following specific embodiments, in which.

DETAILED DESCRIPTION OF EMBODIMENTS

Figure 1:
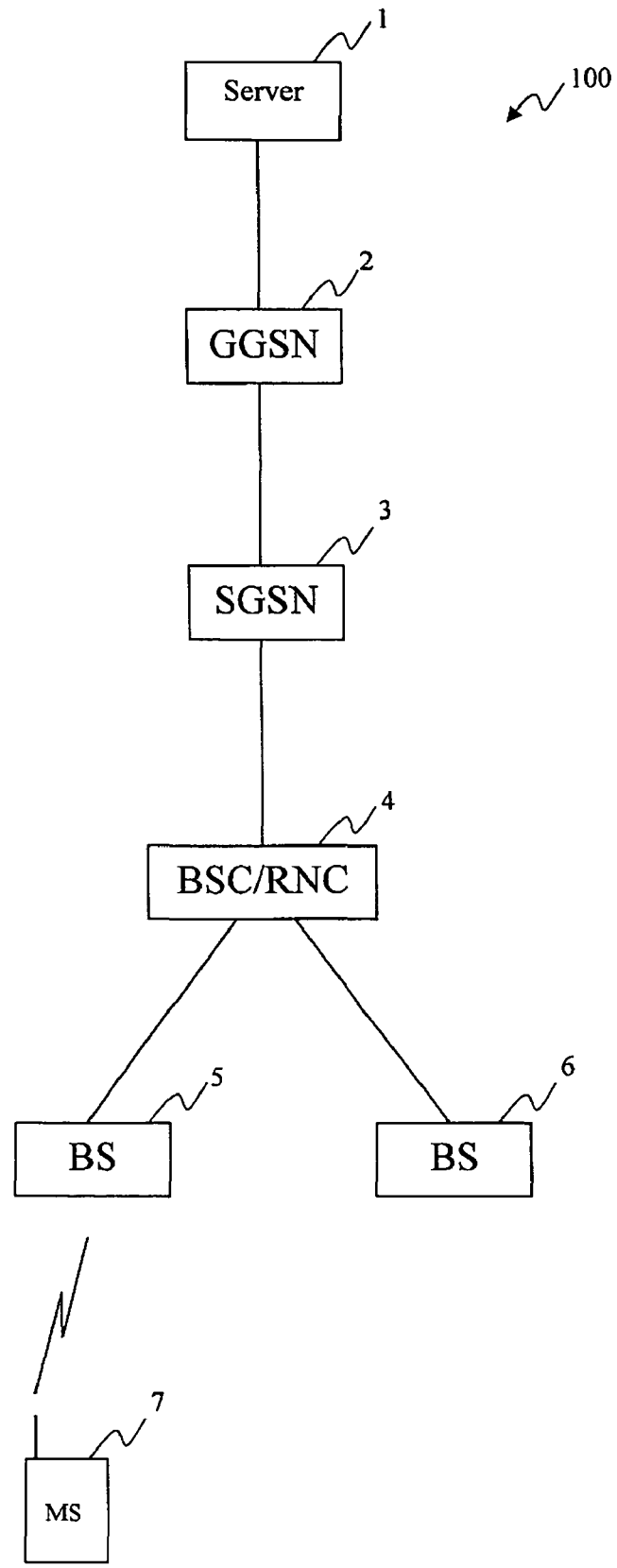
FIG. 1 shows a packet switched mobile telecommunications network in an embodiment of the present invention may be implemented.

FIG. 1 illustrates schematically an example of a cellular network supporting packet-switched services in which the present invention may be implemented. The network 100 may be a 2G GPRS or a 3G GPRS network. Alternatively, the system 100 may be an EDGE/EGPRS network. Only some of the network elements of a 2G/3G network are illustrated in FIG. 1.

The radio access network comprises a number of base station systems. Each base station system comprises a base station controller (BSC) 4 and a number of base stations (BS) 5, 6. A terminal or mobile station (MS) 7 communicates with a base station 5 over a radio interface. The packet-switched core network of the system 100 comprises a number of GPRS Supporting Nodes (GSN). Each mobile station registered for packet-switched services has a serving GSN, called SGSN, 3 which is responsible for controlling the packet-switched connections to and from the mobile station. The packet-switched core network is typically connected to further packet-switched networks via a Gateway GSN (GGSN) 2. Services may be provided to the mobile station from an application server 1 connected to the GGSN 2.

In a cellular network, the MS 7 can be in a number of different states depending if it is transmitting data, or has transmitted data recently or not. The state has a significant impact on the power consumption of mobile terminals in the network.

In 2G GPRS a terminal can be either in the state Ready (in which the MS is tracked at cell level) or the state Stand-by (MS tracked in Routing Area (RA) level, A routing area comprising many cells). In the ready state, cell updates are required each time the MS changes cell. In the stand-by state, The MS only needs to send updates when changing RA and the MS will be paged in the RA in case of a downlink packet.

Figure 2:
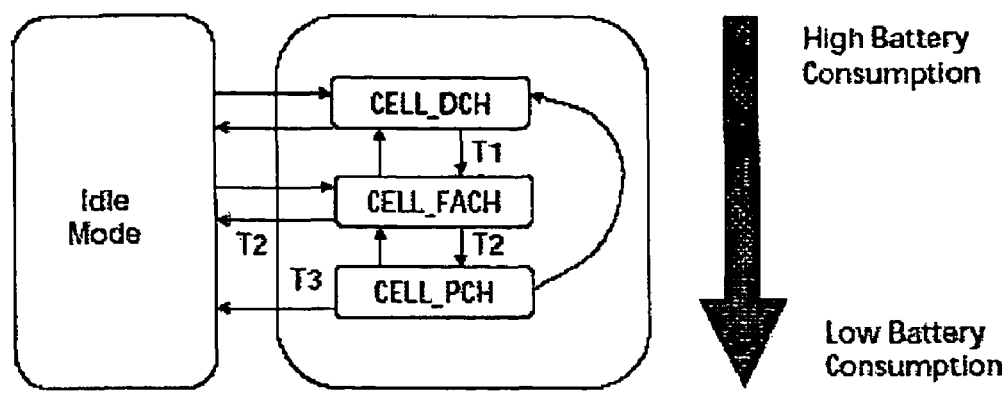
FIG. 2 shows radio resource states, inactivity timers and battery consumption in a terminal in a 3G mobile network.

FIG. 2 illustrates the states in a 3G GPRS network. The terminal is in one of the following states:

CELL_DCH (Dedicated Channel). The MS is tracked at cell level. In this state, the current consumption is at its highest, comparable to the consumption during circuit-switched voice calls. The current consumption is around 220 mA or higher. The phone has a dedicated channel, which it does not share with other phones, so maximum throughput and minimum delay are achieved.

CELL_FACH (Forward Access Channel). MS tracked at cell level. In this state, the phone shares the channel with other phones. This state is used when there is not much traffic to transmit. The battery consumption is roughly half of the consumption in the CELL_DCH state. The current consumption is roughly 120 mA.

CELL_PCH (Paging Channel). MS tracked at cell level. This optional state offers the lowest current consumption of around 1-2 percent of the consumption in CELL_DCH state (around 4 mA). If there are downlink packets for the terminal, the terminal will be paged. In this state, the terminal is not able to send or receive packets, but the terminal will have to enter either the CELL_DCH or CELL_FACH state to send or receive. Not all network implementations currently use the CELL_PCH state.

URA_PCH. MS tracked at UTRAN Registration Area (URA) level. If there are downlink packets for the terminal, the terminal will be paged in the URA. There are less updates but more paging than CELL_PCH. This state provides the same benefits as CELL_PCH and further enhances the battery performance when there is mobility.

Idle mode. MS tracked at Routing Area level by the SGSN and there are no context in RNC. In this state, the phone does not have an RRC connection, so it is not possible to send or receive packets in this state. The terminal can still have a PDP context and it can be reached by paging procedures, after which the terminal can leave the idle mode and receive downlink packets. However an RRC connection will have to be established before the downlink packets can be received.

State transitions are based either on explicit signaling or inactivity timers. The timers T1, T2 and T3 are shown in FIG. 1. The names T1, T2 and T3 are not officially used in 3GPP specifications but they have established in WCDMA parlance. The timers are network controlled and managed by the Radio Network Controller (RNC). The timers are discussed below:

T1 is an inactivity timer that is used in the CELL_DCH state. This timer is reset whenever there is traffic. The timer will expire only after an inactive period of T1, and the terminal will enter the CELL_FACH state. The shorter the T1 timer, the worse the user experience will be e.g. in web browsing. The T1 value may depend on the DCH data rate. The default values used in the Nokia RNC implementation are 5 seconds for 8-32 kbit/s, 3 seconds for 128 kbit/s, and 2 seconds for data rates greater than 128 kbit/s. In some networks, significantly longer timers than the Nokia defaults may be used.

T2 is an inactivity timer in the CELL_FACH state. If CELL_PCH is used, the state machine will enter the CELL_PCH state after an inactivity period of T2. If CELL_PCH is not used, then the state machine will enter the idle state. The default value in Nokia's implementation is 2 seconds, but often significantly longer T2 values are used.

T3 is a timer used in CELL_PCH (and in the URA_PCH state that may be introduced in the future). After staying in the CELL_PCH or URA_PCH for T3 seconds, the RRC connection will be released. This is typically a very long timer (several minutes or even tens of minutes).

The inactivity timers T1 and T2 define the time after which the phone transitions from the more power-consuming states to less consuming states. The sum T1+T2 defines the general power consumption behavior of the device, and the value of T1 has a significant effect on the perceived performance of several applications.

Always-on applications require the terminal to be constantly attached to a radio network. In order to keep the connection active, many always-on applications require that frequent keep-alive messages are transmitted between the terminal and a server node in the network, for example between the mobile station 7 and the application server 1 shown in FIG. 1

Transmission of a keep alive message (like any packet) moves the mobile station into, or maintains the MS in a high power state (e.g. Ready state in 2G, CELL_DCH or CELL_FACH in 3G).

It is often assumed that in packet based cellular networks, after a packet transmission the probability of a new packet transmission within a short period of time (e.g. up to a few seconds) is quite high. But this assumption is not true with respect to keep alive messages.

Many applications tend to send keep alive message regularly, but at intervals of 15 seconds to 10 minutes. For example, Skype sends client originated keep-alive every 60 seconds. Nokia Email has a keep-alive sent by server every 4 minutes. A VPN client behind a NAT might send keep-alive every 30 seconds.

With keep alive intervals within this range, the MS may be most of the time in an high power state (in 2G GPRS_Ready; in 3G PMM Connected DCH/FACH), as short data transmissions are sent/received only at regularly spaced intervals. This uses a lot of unnecessary battery power. In addition, it requires a lot of radio signalling (compared to the amount of data transferred) and thus consumes network resources. Transferring keep alive is not very cost efficient for operators.

One way in which this problem could be addressed is by using timers in the radio optimised for keep-alive. For example, the length of timers such as T2 can be kept short, e.g. around 2 s. However these timers may not be optimised for other applications like browsing. Today operators have asked for T2=120 seconds probably due to browsing behaviour.

According to one embodiment of the present invention, radio and mobility management timers are adapted dynamically depending on the pattern of traffic used. A node such as an SGSN or RNC controls timer setting by:
monitoring the traffic pattern of one subscriber;
detecting a keep alive pattern;
storing traffic characteristics in a context related to the terminal; and
adapting timers to fit best the mobile traffic type.

The traffic characteristics (e.g. TCP keep-alive every 60 s, MS initiated) are stored in a new field "traffic profile" in the subscriber context (in SGSN or RNC), and transferred to a new node due to mobility events (such as inter SGSN RA update; SRNC relocation).

The following specific embodiment is discussed with respect to a 2G GPRS network. In other embodiments, the method can be applied to a 3G network in a similar way.

Figure 4:
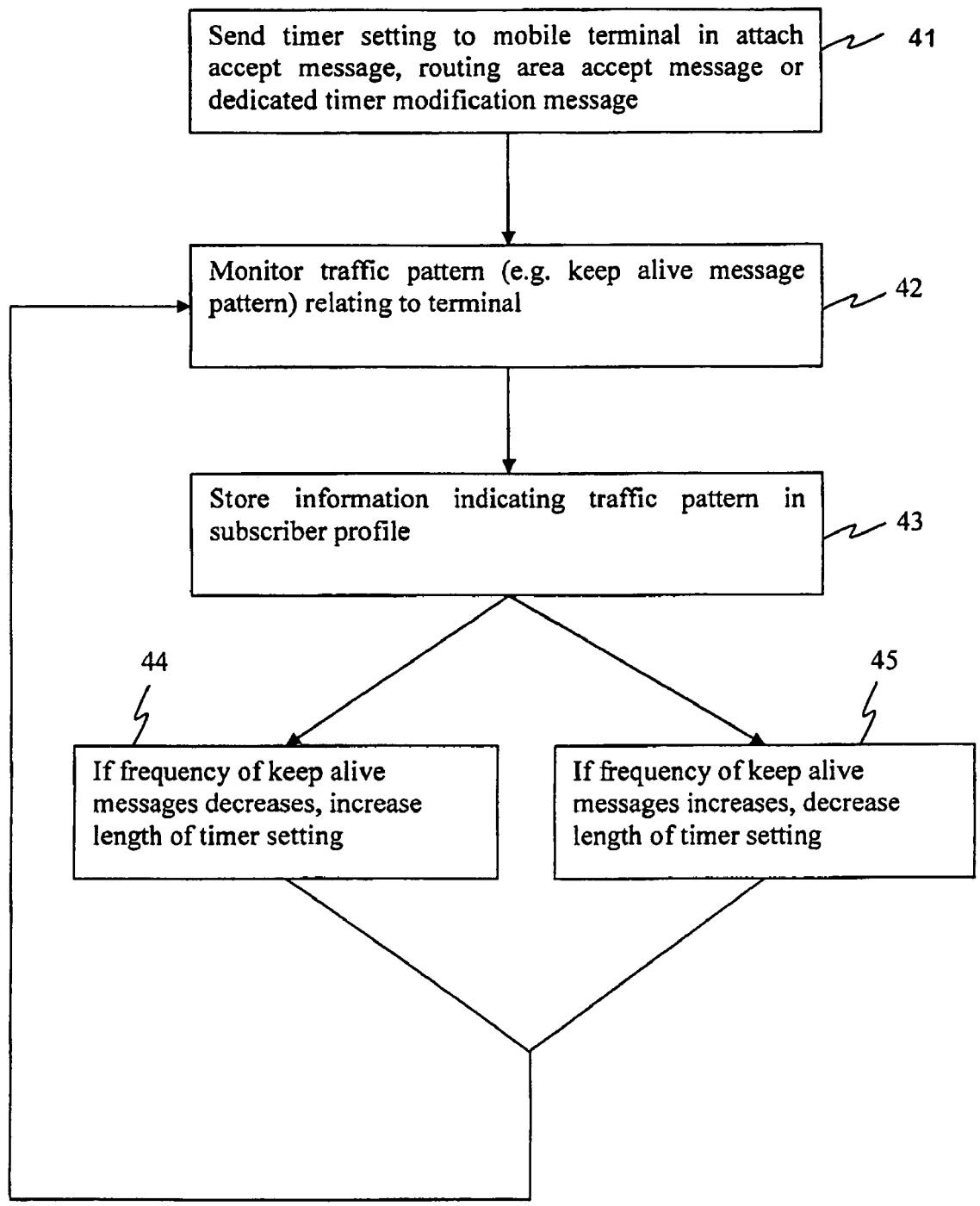
FIG. 4 shows a flow diagram for practicing an exemplary embodiment of the invention.

FIG. 4 shows a flow diagram of how one embodiment of the present invention may be implemented in a GPRS network 100 as shown in FIG. 1. At step 41, an SGSN 3 sends attach accept and RA update accept messages to a mobile terminal 7. These messages may include a ready timer and/or a periodic RA update timer, by which it is meant that the SGSN 3 indicates to the mobile terminal 7 in one or more such messages a setting for a length or period for these timers. The setting of the ready timer, for example, defines the length of a period of time, after which the terminal shifts from the ready to the standby state, if the terminal is inactive during that period.

For MS who initiate keep-alive regularly, the ready timer should be kept very short in order to reduce the amount of cell updates after a transmission. A value of 5 to 10 second should be appropriate. The drawback of this is that the amount of paging would increase. The operator could consider reducing the size of the RA to reduce paging load. A relative short value of the periodic Routing area update (e.g. 30 minutes) should also be appropriate (Normally these MS will not perform periodic RA update due to frequent packet transmission. However, if they move out of coverage, the periodic RA update will expire and paging will be suspended. It will save paging capacity). However, such a setting would not be optimal for other users who are not having regular keep-alive message.

Thus according to one embodiment of the present invention, the SGSN 3 initially (e.g. at attach) sends to the MS 7 a short Ready timer setting (5-10 seconds) and a short periodic RA Update timer (20-40 minutes). These timers are set to a value adapted for users having regular keep-alive.

At step 42, the SGSN 3 starts to monitor the traffic pattern, and at step 43 stores in the subscriber specific traffic profile information related to the usage of keep-alive. In particular, the mobile station 7 may be sending keep alive messages to the application server 1 in order to maintain a connection necessary for the server 1 to provide a service to the MS 7. If the user is not sending keep-alive messages at or above a predefined frequency, in the next RAU response the SGSN 3 resets the timers to a different setting more appropriate for a terminal which is not sending regular keep-alive messages.

For example, the Ready timer is set to 60 seconds and the periodic RA Update timer is set to 2 hours (see step 44 in FIG. 4).

The SGSN 3 keeps monitoring the traffic pattern of this subscriber, as the user might activate a new application on his phone. At the next RA update the SGSN 3 again sets the timers appropriately based on the latest traffic pattern of the user. For instance, if activation of a new application leads to an increase in the frequency of keep alive messages, the SGSN may decrease the length of the timer setting (see step 45).

It should be noted that if the MS 7 is not moving (so no RA update is triggered by movement) and sending traffic regularly, (periodic RA update timer never expires), the SGSN 3 may not be able to modify the timers. Using a small RA size will increase the probability that the user cross a RA border.

In certain cases, the SGSN 3 may want to modify the timers, but may not receive RA updates. In that case, the SGSN 3 sends a message to the MS 7 to trigger a modification of the timers. This message may be sent according to a "timer modification procedure", a dedicated message which can be used to reset the timers and generate a RA update.

One way in which to reset the timers would be for the SGSN 3 to detach an MS with a reattach indication. The SGSN 3 may take into account the load on a paging channel when setting the timers. The SGSN 3 may for example detect that a paging channel is overloaded and/or that certain MS 7 generate a lot of paging. Typically that could be the case if keep-alive is generated from the server, and the keep-alive intervals are short. In this case the SGSN 3 detaches the MS 7, forcing it to re-attach and then sets a longer ready timer (reducing paging load at the expense of cell update load). Although in this embodiment the power consumption of the terminal may increase, in certain circumstances it may be necessary to avoid overloading on the paging channel.

Figure 3:
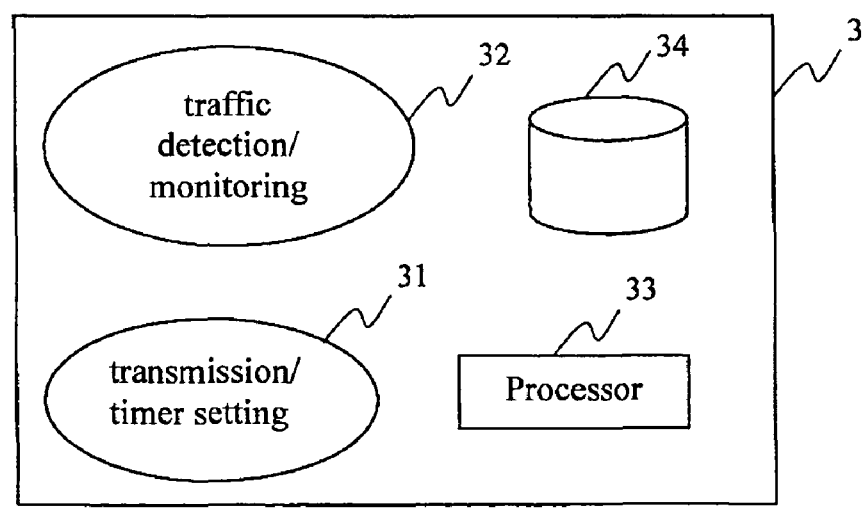
FIG. 3 shows features of a serving GPRS support node in an embodiment of the present invention.

The method may be controlled by a traffic detection engine in, for example, an SGSN 3 or BSC/RNC 4. FIG. 3 shows in more detail the SGSN 3 in which are represented certain features of one embodiment of the present invention. The SGSN 3 comprises a timer regulating/setting means 31, which may comprise a transmission means for sending timer setting messages to the BSC/RNC 4 for forwarding to the MS 7. The SGSN 3 also comprises a traffic monitoring means/traffic detection engine 32 which collects the relevant data relating to the MS 7. The data may be stored in a traffic profile field along with other data relating to the subscriber of the MS 7, in a storage means 34 also provided in the SGSN 3. Processes performed by the SGSN 3 may be controlled by a suitably programmed processor means 33.

In one embodiment the traffic detection engine 32 is able to derive the number and/or frequency of keep-alive messages transmitted to/from the terminal 7. Different applications running on a single MS may generate or require their own keep alive messages. Thus each keep-alive application should have a profile containing the following information:
keep-alive frequency;
keep alive direction;
keep-alive L3/L4 characteristics (IP address/port numbers);
paging frequency.

In a further embodiment, the SGSN 3 also monitors the mobility of the user. For example, the SGSN 3 may monitor the frequency of cell changes. If the user has not changed cell for an extended period, e.g. at least 24 hours, the SGSN 3 may determine that the MS 7 is static and increase the ready timer value (the MS is not sending cell updates so it can stay in the ready state for longer).

In one embodiment employing a 2G GPRS network, the timers are initially set based on traffic profile, but these settings can be modified or overruled based on mobility data of the terminal, e.g. if the MS 7 is static.

In another embodiment, the traffic profile is sent between nodes during inter SGSN Routing Area Update, Intersystem inter SGSN RA update, or SRNC relocation. This may be done because it takes time to determine a traffic pattern (to be accurate it might be worth waiting for 3 consecutive keep alive messages which can take 10-20 minutes). By sending the traffic profile to a new node with which the terminal has just established a connection, the new node can immediately set its timer accordingly.

Although the above embodiments have been described with respect to a 2G GPRS network, the method may also be implemented with timers in 3G networks. In 3G networks such as UMTS and WCDMA, key timers regulating Radio Resource Control states are controlled by the RNC. Thus in alternative embodiments employing 3G networks, an RNC operates the same pattern detection mechanism and modifies the timers accordingly. In further embodiments implemented in 3G networks, the pattern detection is performed in a 3G SGSN, and the results or timers setting are sent to the RNC during RAB establishment or RAB modification. If the pattern changes (for instance if the user activates a new application), the SGSN detects this and sends a RAB modification to the RNC. The RNC then adjusts its timers.

Embodiments of the present invention are applicable to all wireless packet technology, and so may also be applied to WiMAX or 3.9G (also referred to as 3G long-term evolution or 3G LTE) networks.

Although in the appended claims the dependant claims refer only to an independent claim on which they depend, embodiments of the present invention may encompass any combination of features disclosed in the claims. In particular, embodiments of the present invention may comprise features from any two or more dependant claims in combination with an independent claim on which they depend.

What is claimed is:

1. A method comprising: a) monitoring, by a node of a packet switched core network, a traffic pattern relating to a terminal; and b) regulating states of the terminal according to the monitored traffic pattern, wherein the monitored traffic pattern comprises a keep alive message pattern relating to keep alive messages transmitted by the terminal; and
further comprising, between monitoring and regulating, detecting a keep alive pattern and deriving from the detected keep alive pattern a keep-alive profile including information about at least two of a keep alive frequency, a keep alive direction, and keep alive L3/L4 characteristics regarding an internet protocol address/port number.

2. A method according to claim 1, wherein the step of regulating states comprises setting a timer of the terminal.

3. A method according to claim 2, wherein the setting of the timer defines a period after which the terminal shifts to a state having a lower power consumption, if the terminal is inactive during the period.

4. A method according to claim 3, wherein if a frequency of the keep alive messages decreases, a length of the period is increased.

5. A method according to claim 3, wherein if a frequency of the keep alive messages increases, a length of the period is decreased.

6. A method according to claim 1, wherein the terminal is a mobile terminal.

7. A method according to claim 1, further comprising storing data indicative of the monitored traffic pattern in the node.

8. A method according to claim 7, wherein the node is a first controller node having a connection with the terminal.

9. A method according to claim 8, further comprising transmitting the data to a second controller node when the terminal establishes a connection with the second controller node.

10. A method according to claim 1, wherein the node is having a connection with the terminal.

11. A method according to claim 10, wherein the controller node sends an indication of a timer setting to the terminal in an attached accept message, a routing area accept message or a dedicated timer modification message.

12. A method according to claim 1, further comprising monitoring, by the node of the packet switched core network, mobility of the terminal.

13. A method according to claim 12, comprising setting a timer according to the monitored mobility of the terminal and the monitored traffic pattern of the terminal.

14. A method according to claim 12, wherein if mobility of the terminal decreases, a length of a period of inactivity after which the timer expires is increased.

15. A method according to claim 1, wherein the monitored traffic pattern comprises a level of paging traffic associated with the terminal.

16. A method according to claim 1, further comprising setting a periodic routing area update timer for the terminal according to at least one of the monitored traffic pattern and mobility of the terminal.

17. A method according to claim 1, wherein the node of the packet switched core network comprises a serving general purpose radio service support node.

18. An apparatus configured to: a) monitor a traffic pattern relating to a terminal; and b) regulate states of the terminal according to the monitored traffic pattern, wherein the apparatus comprises a node of a packet switched core network, wherein the monitored traffic pattern comprises a keep alive message pattern relating to keep alive messages transmitted by the terminal; and
further configured, between monitoring and regulating, to detect a keep alive pattern and deriving from the detected keep alive pattern a keep-alive profile including information about at least two of a keep alive frequency, a keep alive direction, and keep alive L3/L4 characteristics regarding an internet protocol address/port number.

19. An apparatus according to claim 18, which is configured to regulate states by setting a timer of the terminal.

20. An apparatus according to claim 18, wherein the node of the packet switched core network comprises a serving general purpose radio service support node.

21. A non-transitory computer readable storage medium embodied with a computer program comprising a set of instructions which when executed by a processor in a node of a packet switched core network of a communications system, causes the node of the packet switched core network to a) monitor a traffic pattern relating to a terminal, and b) regulate states of the terminal according to the monitored traffic pattern, wherein the monitored traffic pattern comprises a keep alive message pattern relating to keep alive messages transmitted by the terminal; and
further between monitoring and regulating, to detect a keep alive pattern and deriving from the detected keep alive pattern a keep-alive profile including information about at least two of a keep alive frequency, a keep alive direction, and keep alive L3/L4 characteristics regarding an internet protocol address/port number.

22. A non-transitory computer readable storage medium according to claim 21, wherein the node of the packet switched core network comprises a serving general purpose radio service support node.

23. A method comprising: a) monitoring, by a node of a packet switched core network, a traffic pattern relating to a terminal; and b) regulating states of the terminal according to the monitored traffic pattern, wherein the monitored traffic pattern comprises a keep alive message pattern relating to keep alive messages transmitted by the terminal; and further comprising, between monitoring and regulating, detecting a keep alive pattern and deriving from the detected keep alive pattern a keep-alive profile including information about at least two of a paging frequency, a keep alive direction, and keep alive L3/L4 characteristics regarding an internet protocol address/port number.

* * * * *